Figure 1:
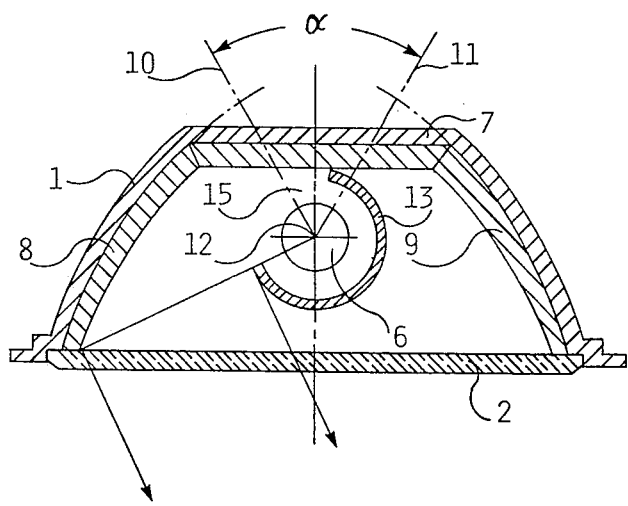

United States Patent [19]

Schäfer et al.

[11] 4,443,834
[45] Apr. 17, 1984

[54] INTERIOR LIGHTING FOR VEHICLES WITH ROTATABLE MASK

[75] Inventors: Heinz Schäfer, Geseke; Wilhelm Schrader, Erwitte, both of Fed. Rep. of Germany

[73] Assignee: Westälische Metall Industrie KG Hueck & Co., Lippstad, Fed. Rep. of Germany

[21] Appl. No.: 357,703

[22] Filed: Mar. 12, 1982

[30] Foreign Application Priority Data

Apr. 7, 1981 [DE] Fed. Rep. of Germany ....... 3113964

[51] Int. Cl.³ .............................................. F21V 7/14
[52] U.S. Cl. .................................. 362/280; 362/282; 362/347; 362/284; 362/350; 362/301; 362/343; 362/303; 362/323; 362/324
[58] Field of Search ............... 362/282, 284, 297, 303, 362/325, 347, 350, 280, 323, 301, 322, 343, 61, 324

[56] References Cited

U.S. PATENT DOCUMENTS

| | | | |
|---|---|---|---|
| 1,232,046 | 7/1917 | Kleinert | 362/303 X |
| 1,658,679 | 2/1928 | Hill et al. | 362/284 |
| 1,766,199 | 6/1930 | Smith | 362/284 X |
| 1,834,542 | 12/1931 | Karlebo | 362/347 X |
| 2,228,476 | 1/1941 | Murray | 362/284 |
| 3,267,274 | 8/1966 | Johnson | 362/282 |
| 4,238,817 | 12/1980 | Fratty | 362/303 X |
| 4,336,579 | 6/1982 | Lord | 362/282 X |

*Primary Examiner*—Peter A. Nelson
*Attorney, Agent, or Firm*—Max Fogiel

[57] ABSTRACT

Interior light for vehicles with a reading mode in which the beam can be directed toward either the driver or the front-seat passenger as desired. The light has an opaque screen (13) in the path of the rays of light between the bulb (6) and the reflector (1). The screen has a cutout (15). The reflector (1) consists of at least two paraboloid reflecting surfaces (8 and 9) with optical axes (10 and 11) that meet at an angle α. The mask (13) is adjusted so that the cutout (15) directs the light against one or the other of the reflecting surfaces (8 or 9).

11 Claims, 4 Drawing Figures

INTERIOR LIGHTING FOR VEHICLES WITH ROTATABLE MASK

The invention is an interior light for vehicles that has a concave reflector behind the bulb and an opaque mask with a cutout that can be variably positioned in the path of the rays to alter their direction.

The mask in an interior light of this type that is specified in German GM 1 967 071 can be positioned to illuminate either the interior of the vehicle as a whole or only a limited area, as might be required for reading. This light employs a reflector and a lens mounted in an adjustable mask. Although the most practical location for such a light is in the roof of the vehicle, the intensity of its illumination in the reading mode will often be inadequate because the roof structure on some vehicles is too thin to accommodate a large enough reflector. Another disadvantage is that the aim of the reading light is fixed.

The objective of the invention is an interior light that can be mounted in the roof of a vehicle between the driver and the front-seat passenger and that has a mask that can be positioned in relation to the bulb so that the beam in the reading mode can be directed as desired toward either the driver or the passenger, will be sharply focused, and will be very intense even when the roof structure is thin.

This objective is attained because (a) the mask is positioned in the path of the rays and between the bulb and the reflector, (b) the reflector consists of at least two parabolic reflecting surfaces with optical axes that meet at an angle, and (c) the size, shape, and variable position of the cutout allow it to direct light onto either reflecting surface.

Another advantage is that, in the reading mode, the rays reflected by the parabolic surfaces will be parallel so that the illuminated area will be uniform in intensity.

It is practical to mount the mask with the cutout between the bulb and a lighting disk that is in front of the reflector. This provides effective illumination of the interior of the vehicle as a whole.

In one preferred and economically manufactured embodiment of the invention the paraboloidal reflecting surfaces are part of a plastic housing that protects them against dust and dirt.

It is practical for the size and shape of the cutout to be such that the rays of light leaving the filament of the bulb strike the total optical surface of the lighting disk. This provides optimal illumination of the interior of the vehicle as a whole.

It is also practical to blacken the surface of the mask that faces the bulb to prevent interference from light reflected from it.

The embodiment of the invention will also be cheaper to manufacture if the cutout mask is cylindrical with its axis more or less parallel to the lighting disk and intersecting the common focal point of the paraboloidal reflecting surfaces. The bulb will then extend into the cylindrical mask through one open end and its filament will lie on the focal point.

In another practical embodiment of the invention the cylindrical mask can be rotated around its axis by an externally activated control. One practical type of control incorporates, first, a toothed rack that is mounted against a surface of the housing that faces the rear of the light and that can be longitudinally displaced by a knob that is cast in one piece with it, that is visible from the front, and that slides back and forth in a longitudinal slot and, second, a pinion that is fixed to the bottom of the mask and engages the rack.

In another embodiment of the invention the externally activated control incorporates, first, a disk mounted in one wall of the housing or the reflector and projecting out from the inside of the light through a slit and, second, a pin that is fixed to the bottom of the cylindrical mask and eccentric to its axis and that engages a radial groove in the disk. This embodiment is especially simple to manufacture.

Figure 2:
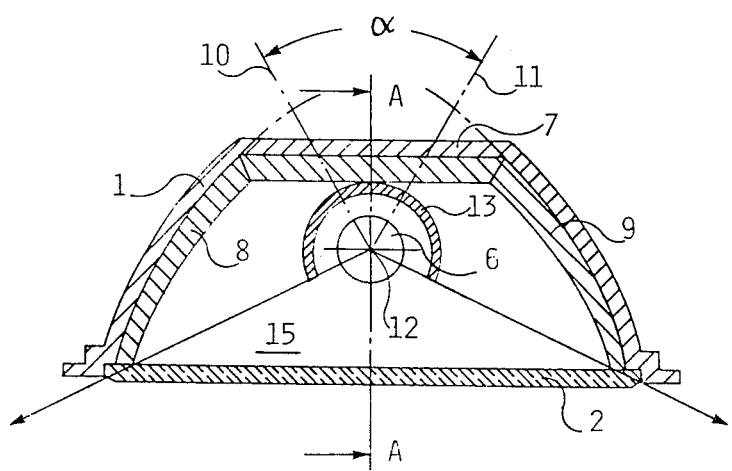
Figure 4:
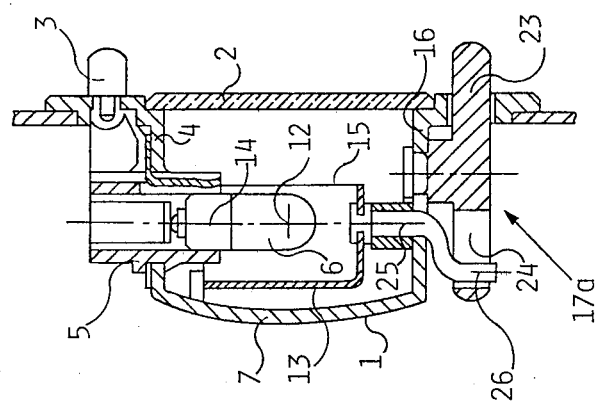
Figure 3:
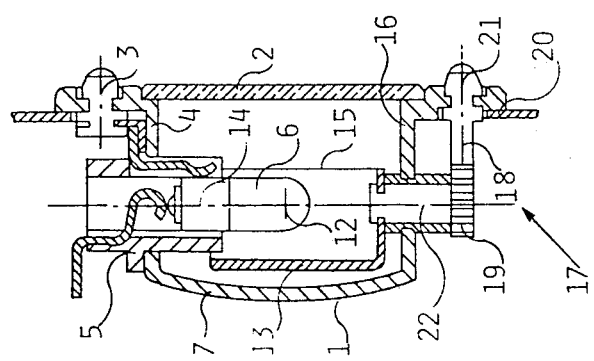

In the drawings, which illustrate two embodiments of the invention,

FIG. 1 is a longitudinal section through an interior light with two paraboloid reflecting surfaces in which one reflecting surface and the lighting disk are screened from the light source by a mask, FIG. 2 a longitudinal section through a light in which both reflecting surfaces are screened from the rays of the bulb by the mask and the light strikes the lighting disk directly, and FIGS. 3 and 4 a section through the line A—A of two different versions of an externally activated control.

The drawings show an interior light mounted in the roof, not shown, of a vehicle between the driver and the front-seat passenger. The light can be employed to illuminate the interior of the vehicle as a whole or to provide reading illumination for either the driver or the passenger as desired.

The housing of the interior light, which forms a reflector 1, is plastic and has a rectangular light-delivery surface. Rectangular lighting disk 2 is framed by the edge of reflector 1 in which it is mounted self-supporting. There is a sliding switch 3 with one "on" and two "off" positions, one of which is activated by a door-frame switch, in the edge of reflector 1.

The socket 5 of bulb 6 is mounted approximately in the middle of a flattening 4 in reflector 1 beside sliding switch 3 and perpendicular to lighting disk 2. The rear of reflector 1 has another flattening 4 that is bordered by two paraboloid reflecting surfaces 8 and 9 with optical axes 10 and 11 that meet in an angle $\alpha$ of approximately 60°. The filament 12 of a bulb 6 lies in the common focal point of the two surfaces 8 and 9. Bulb 6 extends through one end of and into a cylindrical mask 13 that rotates around its own axis 14, which is parallel to lighting disk 2, with filament 12 on the axis. Mask 13 has a cutout 15 that is equidistant from its axis 14.

One end of cylindrical mask 13 is at the flattening 16 of reflector 1 opposite the socket 5 of the bulb. Mask 13 rotates on this end around its axis 14 against flattening 16. Mask 13 is rotated by an externally activated control 17, 17a.

FIG. 2 shows an embodiment wherein the reflector is entirely maskable against light emanating from the bulb.

FIG. 3 shows a control 17 that essentially incorporates a toothed rack 18 around a pinion 19 that is fastened firmly to mask 13 and that engages the rack. Rack 18 is mounted against a surface 20 of the reflector edge that faces the rear of the light. A knob 21 that is cast in one piece with the middle of the rack projects through a longitudinal slit in the edge of reflector 1. The pinion 19 that engages rack 18 is fastened firmly to the bottom of cylindrical mask 13 by a shaft 22 mounted in the flattening 16 in reflector 1. Knob 21 on rack 18 can be displaced along the longitudinal slit to rotate mask 13 with its cutout 15 around bulb 6.

FIG. 4 shows a control 17a for rotating mask 13 that consist of a circular disk 23 that rotates in a bearing in the flattening 16 in reflector 1 that is perpendicular to lighting disk 2 and of a spherical shaft 25 that is fastened firmly to the bottom of mask 13 and that engages with a radial longitudinal groove 24 in disk 23. Circular mask 23 projects more or less out through a longitudinal slit in the edge of reflector 1. Rotating circular disk 23 will revolve a pin 26 that is mounted on the crank-shaped shaft 25 in the flattening 16 on reflector 1 and that engages with the radial longitudinal groove 24 in circular disk 23 and rotate mask 13, which is firmly attached to shaft 25, around bulb 6.

We claim:

1. Interior light for vehicles comprising: a concave reflector behind a bulb; an opaque mask with a cutout that can be variably positioned in the path of light rays from the bulb to alter their direction, said mask being positioned in the path of the rays and between the bulb and the reflector; said reflector comprising at least two paraboloid reflecting surfaces with optical axes intersecting at a predetermined angle; said cutout in the mask having a size, shape, and variable position for allowing the mask to direct light onto either reflecting surface while blocking light from impinging upon the other paraboloidal surface, the interior light being also a reading light for persons in different seated positions whereby rays reflected by said paraboloid reflecting surfaces are parallel so that illuminated areas have uniform light intensity, said reflector being entirely maskable against light emanating from said bulb.

2. Interior light as defined in claim 1, wherein the mask can be positioned so that the cutout lies between the bulb and a lighting disk in front of the reflector.

3. Interior light as defined in claim 1 or 2, wherein said paraboloidal reflecting surfaces are located in a one-piece plastic housing.

4. Interior light as defined in claim 2, wherein the size and shape of the cutout in the mask are such that light leaving the filament in the bulb arrives directly on total optically active surface of the lighting disk.

5. Interior light as defined in claim 1, wherein said mask has a blackened surface facing a filament of the bulb.

6. Interior light as defined in claim 2, wherein said mask with the cutout is cylindrical, said bulb having a filament lying along an axis thereof, said axis being substantially parallel to said lighting disk and on a common focal point of the paraboloidal reflecting surfaces.

7. Interior light as defined in claim 6, wherein said bulb has a glass part projecting through one end of and into the cylindrical mask.

8. Interior light as defined in claim 7, wherein said cylindrical mask has a closed end rotatable by an externally activated control inside the housing and about said axis.

9. Interior light as defined in claim 8, wherein the externally activated control comprises a toothed rack mounted against a surface facing the rear of the light and displaceable longitudinally by a knob cast in one piece with said rack, said rack being visible from the front and sliding back and forth in a longitudinal slot, and a pinion fixed to said mask and engaging said rack.

10. Interior light as defined in claim 8, wherein said externally activated control comprises a circular disk mounted in one wall of the housing and projecting out from the inside of the light through a slit and a pin fixed to the cylindrical mask and eccentric to said axis and engaging a radial groove in the disk.

11. Interior light as defined in claim 1, wherein the mask can be positioned so that the cutout lies between the bulb and a lighting disk in front of the reflector, said paraboloidal reflecting surfaces being located in a one-piece plastic housing, the size and shape of the cutout in the mask being such that light leaving the filament in the bulb arrives directly on total optically active surface of the lighting disk, said mask having a blackened surface facing a filament of the bulb, said mask with the cutout being cylindrical, said bulb having a filament lying along an axis thereof, said axis being substantially parallel to said lighting disk and on a common focal point of the paraboloidal reflecting surfaces, said bulb having a glass part projecting through one end of and into the cylindrical mask, said cylindrical mask having a closed end rotatable by an externally activated control inside the housing and about said axis, said externally activated control comprising: a toothed rack mounted against a surface facing the rear of the light and displaceable longitudinally by a knob cast in one piece with said rack, said rack being visible from the front and sliding back and forth in a longitudinal slot, and a pinion fixed to said mask and engaging said rack.

* * * * *